US008509366B1

(12) United States Patent  
Heikkilä

(10) Patent No.: US 8,509,366 B1  
(45) Date of Patent: Aug. 13, 2013

(54) METHOD, APPARATUS AND COMPUTER PROGRAM FOR CALCULATING A NOISE COVARIANCE ESTIMATE

(75) Inventor: Markku Johannes Heikkilä, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/359,046

(22) Filed: Jan. 26, 2012

(30) Foreign Application Priority Data

Jan. 23, 2012 (GB) .................................. 1201064.1

(51) Int. Cl.
*H04B 7/10* (2006.01)

(52) U.S. Cl.
USPC ........... 375/347; 375/260; 375/295; 375/316; 375/340; 375/342

(58) Field of Classification Search
USPC ................. 375/135, 147, 219, 259, 260, 261, 375/262, 267, 271, 278, 290, 295, 299, 316, 375/321, 340, 345, 346, 347, 350
See application file for complete search history.

(56) References Cited

U.S. PATENT DOCUMENTS

| 8,175,200 | B2 * | 5/2012 | Chen .............................. 375/346 |
| 8,290,101 | B2 * | 10/2012 | Hamamoto .................... 375/347 |
| 8,320,858 | B2 * | 11/2012 | Ruelke et al. ................. 455/130 |
| 8,325,863 | B2 * | 12/2012 | Stamoulis et al. ............ 375/348 |
| 8,358,588 | B2 * | 1/2013 | Goldsmith et al. ........... 370/252 |
| 2002/0171580 | A1 | 11/2002 | Gaus, Jr. et al. ......... 342/357.06 |
| 2003/0108028 | A1 | 6/2003 | Brunner et al. |
| 2005/0101279 | A1 * | 5/2005 | Lee et al. .................... 455/278.1 |
| 2006/0291596 | A1 | 12/2006 | Piirainen |
| 2007/0126633 | A1 | 6/2007 | Lee ................................ 342/417 |
| 2008/0014876 | A1 | 1/2008 | Heikkila et al. ............ 455/114.2 |
| 2008/0198911 | A1 | 8/2008 | Hui et al. ....................... 375/229 |
| 2009/0116568 | A1 | 5/2009 | Lindoff et al. ................ 375/260 |
| 2010/0067366 | A1 * | 3/2010 | Nicoli ............................ 370/210 |
| 2010/0201572 | A1 | 8/2010 | Lackey et al. ................. 342/373 |
| 2010/0284499 | A1 * | 11/2010 | Lindoff ......................... 375/346 |
| 2011/0085627 | A1 | 4/2011 | Kangas et al. ................. 375/346 |

(Continued)

FOREIGN PATENT DOCUMENTS

CN 101753176 A 6/2010

OTHER PUBLICATIONS

Combined Search and Examination Report under Sections 17 and 18(3)), dated May 17, 2012, issued by the U.K. Intellectual Property Office in related U.K. Application No. GB1201064.1 (5 pages).

(Continued)

*Primary Examiner* — Hirdepal Singh
(74) *Attorney, Agent, or Firm* — Lucas & Mercanti, LLP; Robert P. Michal (57) ABSTRACT

A final NOCE (noise covariance estimate) for reducing noise in a first channel of a receiver with a plurality of antennas is calculated. A first raw NOCE for the first channel is calculated, wherein a raw NOCE for a channel is an initial estimate of the covariance of noise in that channel between the plurality of antennas. At least a second raw NOCE for a second channel is calculated. A metric using the first and second raw NOCEs is calculated. The metric is used to determine whether the second raw NOCE should be included in the calculation of the final NOCE.

38 Claims, 4 Drawing Sheets

(56) References Cited

U.S. PATENT DOCUMENTS

| | | | |
|---|---|---|---|
| 2012/0069889 A1* | 3/2012 | Molnar et al. | 375/227 |
| 2012/0082274 A1* | 4/2012 | Bury | 375/346 |
| 2012/0100877 A1* | 4/2012 | Zangi et al. | 455/501 |

OTHER PUBLICATIONS

PCT International Search Report mailed Jun. 7, 2013 issued in a related PCT international application No. PCT/IB2013/050532 (2 pages).

* cited by examiner

METHOD, APPARATUS AND COMPUTER PROGRAM FOR CALCULATING A NOISE COVARIANCE ESTIMATE

TECHNICAL FIELD

The present invention relates to a method, apparatus for a receiver and a computer program for calculating a noise covariance estimate.

BACKGROUND

The following abbreviations are used in this specification:

| | |
|---|---|
| eICIC | enhanced inter-cell interference coordination |
| FDD | frequency division duplexing |
| FDMA | frequency division multiple access |
| IIR | infinite impulse response |
| IRC | interference rejection combining |
| LTE | Long Term Evolution |
| LTE-A | Long Term Evolution - Advanced |
| NOCE | noise covariance matrix estimate |
| OFDM | orthogonal frequency division multiplexing |
| OFDMA | orthogonal frequency division multiple access |
| PRB | physical resource block |
| RAT | radio access technology |
| SC-FDMA | single-carrier frequency division multiple access |
| TDD | time division duplexing |
| TDMA | time division multiple access |
| UE | user equipment |

Figure 1:
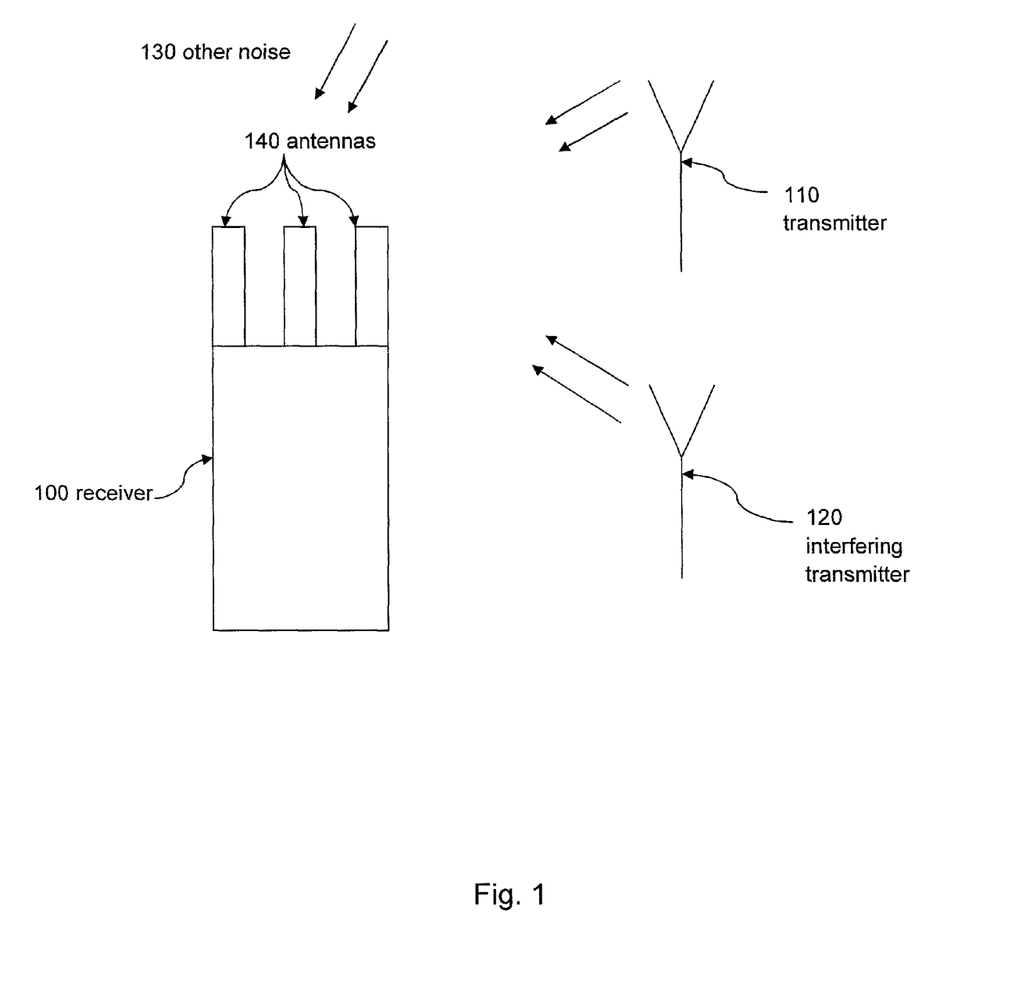
FIG. 1 shows schematically a block diagram illustrating an example of a wireless network in which embodiments of the present invention can be practiced.

In cellular systems, such as the one illustrated schematically in FIG. 1, the quality of a signal received by a receiver 100 from a transmitter 110 can be detrimentally affected by various types of noise, such as interfering signals from other nearby transmitters 120 (for example a base station in a neighboring cell), thermal noise within the receiver 100 itself, and other sources 130. In some cases, noise can affect the quality of a received signal so much that effective reception of data is severely impaired. Thus, to ensure that data is correctly and consistently extracted from a received signal, methods must be implemented that keep the amount of noise interfering with the signal to a minimum and/or that enable the identification and rejection of any noise within a received signal. The latter method is of particular importance for RATs (radio access technologies) that use the same or similar frequency spectrum in adjacent cells, as interference of signals from adjacent cells is inherently high and such systems must rely on interference rejection techniques to remove noise in signals. A particular example is RATs that use LTE (Long Term Evolution) or LTE-A (Long Term Evolution—Advanced) specifications.

There are several techniques known in the prior art for removing noise from a received signal. One such technique is known as Interference Rejection Combining (IRC), which can be used if a receiver 100 has at least two spatially separate antennas 140 or at least two differently polarized antennas 140. A receiver 100 using IRC will receive signals carried on a particular channel via its two (or more) antennas, and will then process these signals separately. The receiver 100 may then combine these processed signals by assigning weightings to each of the processed signals (received by the different antennas) and then adding the weighted signals together. The weightings are assigned according to a noise covariance matrix estimate (NOCE), which represents an estimation of the correlation between the noise received at each antenna. A NOCE is a $N_{RX} \times N_{RX}$ matrix, where $N_{RX}$ is the number of antennas the receiver 100 has. It will be understood that in general "channel" can refer to one or more carrier signals broadcast within a certain time frame or frequency band or with a particular coding, or any combination thereof.

There are a number of known techniques used to calculate NOCEs, many of which use noise vectors $n_{v,t}$ in NOCE calculations. Noise vectors have dimensions of $N_{RX} \times 1$, and each element of the noise vector is an estimate of the amount of noise received by a particular antenna for a signal received by a receiver 100 at a particular time and with a particular frequency (v and t denoting frequency and time respectively).

Noise received in a particular channel is in general both frequency and time dependent due to frequency and time selective fading and also because nearby interfering wireless devices or UEs may have different transmission ranks and pre-codings. This means that, in general, there can be a number of different noise vectors representing differing amounts of noise received at different times and/or frequencies all within the same channel.

A well known method for estimating a NOCE involves first forming intermediate matrices from noise vectors according to Eqn. 1:

$$C_{v,t} = n_{v,t} n_{v,t}^H \qquad \text{Eqn. 1}$$

where $n_{v,t}^H$ is the conjugate transpose of the noise vector $n_{v,t}$ representing the noise received at different antennas of a receiver 100 for a signal with frequency v transmitted at time t, and $C_{v,t}$ is the intermediate matrix for a signal with frequency v transmitted at time t.

A NOCE for noise received in a particular channel can then be calculated by averaging all the intermediate matrices for times and frequencies within that channel. A number of techniques for averaging these different intermediate matrices are known. For example, in one case, a NOCE may be calculated according to a weighted average as shown below in Eqn. 2:

$$C(q) = \Sigma_{v,t} w_{v,t} n_{v,t} n_{v,t}^H = \Sigma_{v,t} w_{v,t} C_{v,t} \qquad \text{Eqn. 2}$$

Here, C(q) is an NOCE for noise received in a particular channel "q" and $w_{v,t}$ is a weighting coefficient, which is frequency and time dependent. The summation may include times and frequencies both within and outside the particular channel q. In the most simple case, all of the intermediate matrices $C_{v,t}$ may be equally weighted. In another example, weightings may be higher for intermediate matrices $C_{v,t}$ for frequencies and/or times within the channel q, and lower for intermediate matrices for frequencies and/or times outside the channel q. In all cases, the weightings are predetermined fixed values.

As another example, a NOCE for noise received in a particular channel can be calculated by first filtering the intermediate matrices $C_{v,t}$ using a fixed filter, which may for example remove intermediate matrices $C_{v,t}$ for frequencies and/or times that are far away from the frequencies and/or times within the channel q. An example of such a filter is an Infinite Impulse Response (IIR) filter. After being filtered, the remaining intermediate matrices $C_{v,t}$ may be averaged as described above.

In these prior art techniques, the weightings and/or filters applied to the intermediate matrices $C_{v,t}$ are applied either in a fixed manner, or according to some global parameter, which may be, for example, an estimate of the channel delay spread or, as another example, an estimate of the maximum Doppler frequency. Thus these weightings and/or filters do not have the capacity to accommodate any sudden or unexpected local changes in interference properties in the frequency and/or time domains. For example, if a NOCE estimate is obtained by averaging over intermediate matrices $C_{v,t}$ (as described above) for frequencies and times that see significantly different amounts of noise in terms of power and spatial signature, then the NOCE estimate may be inaccurate and, consequently, the performance of IRC may be compromised.

SUMMARY

In a first exemplary embodiment of the invention, there is a method for calculating in a receiver a final noise covariance estimate for a first channel, for use in reducing noise in that first channel, wherein the receiver comprises a plurality of antennas and, wherein the final noise covariance estimate is a final estimate of the covariance of the noise received on the first channel between the plurality of antennas of the receiver, the method comprising: calculating a first raw noise covariance estimate, which is an initial estimate of the covariance of the noise received on the first channel between the plurality of antennas of the receiver; calculating at least a second raw noise covariance estimate, which is an initial estimate of the covariance of the noise received on a second channel between the plurality of antennas of the receiver; calculating a metric for the first and second channels using the first and second raw noise covariance estimates; using said metric to determine whether the second raw noise covariance estimate should be included in the calculation of the final noise covariance estimate for the first channel; and, calculating the final noise covariance estimate for the first channel using at least the first and second raw noise covariance estimates if it is determined that the second raw noise covariance estimate should be included; or, calculating the final noise covariance estimate for the first channel using at least the first raw noise covariance estimate but not the second raw noise covariance estimate if it is determined that the second raw noise covariance estimate should not be included.

In a second exemplary embodiment of the invention, there is apparatus for a receiver having a plurality of antennas, the apparatus comprising: at least one processor; and at least one memory including computer program code; the at least one memory and the computer program code being configured to, with the at least one processor, cause the apparatus at least to perform: calculate a first raw noise covariance estimate, which is an initial estimate of the covariance of noise received on a first channel between the plurality of antennas of the receiver; calculate at least a second raw noise covariance estimate, which is an initial estimate of the covariance of the noise received on a second channel between the plurality of antennas of the receiver; calculate a metric using the first and second raw noise covariance estimates; use said metric to determine whether the second raw noise covariance estimate should be included in the calculation of a final noise covariance estimate for the first channel, said final noise covariance estimate being a final estimate of the covariance of the noise received on the first channel between the plurality of antennas of the receiver for use in reducing noise in that first channel; and, calculate the final noise covariance estimate for the first channel using at least the first and second raw noise covariance estimates if it is determined that the second raw noise covariance estimate should be included; or, calculate the final noise covariance estimate for the first channel using at least the first raw noise covariance estimate but not the second raw noise covariance estimate if it is determined that the second raw noise covariance estimate should not be included.

There is also provided a wireless device comprising at least two antennas and apparatus as described above.

There may also be provided a non-transitory computer-readable storage medium comprising a set of computer-readable instructions stored thereon, which, when executed by a processing system, cause the processing system to carry out a method as described above.

Further features and advantages of the invention will become apparent from the following description of preferred embodiments of the invention, given by way of example only, which is made with reference to the accompanying drawings.

DETAILED DESCRIPTION

In the exemplary embodiments, the first raw noise covariance estimate for the first channel provides an estimate of the covariance of the noise received on the first channel between the plurality of antennas of the receiver. However, this estimate can in general be improved by taking into account a second raw noise covariance estimate for another channel provided that the second raw noise covariance estimate provides a reasonably accurate representation of the noise received in the first channel. On the other hand, if a second raw noise covariance estimate that does not provide a reasonably accurate representation of the noise received in the first channel is included in a further/final noise covariance estimate for the first channel, then the quality of the further/final noise covariance estimate may be worse than the quality of the first raw noise covariance estimate. A metric calculated using the first and second raw noise covariance estimates is thus used to provide an indication of how well the second raw noise covariance estimate describes the noise received in the first channel. Thus, including a second raw noise covariance estimate in a calculation for a final noise covariance estimate for the first channel only if it is determined by such a metric that the second raw noise covariance estimate should be included leads to a final noise covariance estimate that is (in general) of equal or improved quality compared to the first raw noise covariance estimate.

In an embodiment, the method comprises: calculating at least a third raw noise covariance estimate for noise received on a third channel; calculating a further metric using the first and third raw noise covariance estimates; and using said further metric to determine whether the third raw noise covariance estimate should be included in the calculation of the final noise covariance estimate for the first channel; wherein the calculating the final noise covariance estimate for the first channel uses the third raw noise covariance estimate if it is determined that the third raw noise covariance estimate should be included, the calculating the final noise covariance estimate for the first channel not using the third raw noise covariance estimate if it is determined that the third raw noise covariance estimate should not be included. Using an additional, third raw noise covariance estimate in the calculation of the final noise covariance estimate for the first channel only if it is determined from its metric that the third raw noise covariance estimate should be included will further improve or maintain the quality of a final noise covariance estimate over the quality of the first raw noise covariance estimate. In practice and more generally, the quality of a final raw noise covariance estimate for a first channel will be maximized by including all raw noise covariance estimates that provide an adequate representation of the noise received in the first channel. In one example, the third channel may be any channel within a certain range from the first channel. In another example, the third channel may be adjacent to the first channel.

In an embodiment, a respective raw noise covariance estimate and a respective metric are calculated for each channel that falls within a predetermined time range and a predetermined frequency range from the time and frequency of the first channel, and wherein the final noise covariance estimate for the first channel is calculated using the first raw noise covariance estimate and all other calculated raw noise covariance estimates for which it is determined from their respective metrics that they should be included in the calculation of the final noise covariance estimate for the first channel. Raw noise covariance estimates for "far away" channels are in practice unlikely to provide a good representation of the noise received on the first channel and are unlikely to be included in the calculation of the final noise covariance estimate for the first channel. This is because the noise received in these "far away" channels is more likely to be significantly different from the noise received in the first channel than the noise received in the "nearby" channels. Thus, only calculating raw noise covariance estimates for channels that are "nearby" (in the time and/or frequency domains) reduces the number of raw noise covariance estimates and the number of metrics that need to be calculated and thus minimizes computation time and also saves power by reducing the processing that is required.

In an embodiment, the second channel is adjacent to the first channel and, if it is determined from the metric for the first and second channels that the raw noise covariance estimate for the second channel should not be included in the calculation of the final noise covariance estimate for the first channel, then no further raw noise covariance estimates for channels that are successively further from the first channel than the second channel are included in the calculation of the final noise covariance estimate for the first channel. Else, if it is determined from the metric for the first and second channels that the raw noise covariance estimate for the second channel should be included in the calculation of the final noise covariance estimate for the first channel, then the method further comprises: calculating a further raw noise covariance estimate for noise received in a further channel, the further channel being adjacent to the second channel, and being the channel that is consecutively further from the first channel after the second channel; calculating a further metric for the second and further channels using the raw noise covariance estimates for the second and further channels; using said further metric to determine whether the raw noise covariance estimate for the further channel should be included in the calculation of the final noise covariance estimate for the first channel; and, calculating the final noise covariance estimate for the first channel using at least the first and second raw noise covariance estimates, but not the raw noise covariance estimate for the further channel or any additional channels that are successively further from the first channel than the further channel, if it is determined that the second raw noise covariance estimate should not be included; or, calculating the final noise covariance estimate for the first channel using at least the first, second and further raw noise covariance estimates if it is determined that the raw noise covariance estimate for the further channel should be included. Evaluating metrics for pairs of adjacent channels means that the metrics can be re-used should a final noise covariance estimate be required for a further channel. This minimizes computation time and also saves power by reducing the processing that is required.

In an embodiment, a raw noise covariance estimate for a subsequent channel is included in the calculation of the final noise covariance estimate for the first channel if it is determined from a metric calculated from said raw noise covariance estimate for the subsequent channel and a raw noise covariance estimate for a channel adjacent to the subsequent channel that said raw noise covariance estimate for the subsequent channel should be included and if the raw noise covariance estimates for every channel that falls between the subsequent channel and the first channel are also determined to be included. If a metric for the first channel and an adjacent channel indicates that the raw noise covariance estimate for the adjacent channel provides a good representation of the noise received in the first channel, then if the raw noise covariance estimate for the next successive channel provides a good representation of the noise received in the adjacent channel, then it is likely to also provide a good representation of the noise received in the first channel, and so on for further channels. Thus requiring that a metric for two adjacent channels indicates that a raw noise covariance estimate for a particular channel provides a good representation of the noise received in an adjacent channel, and requiring that all raw noise covariance estimates for channels between the particular channel and the first channel have been determined, according to their metrics, to be included ensures that the raw noise covariance estimate for that particular channel is likely to provide a good representation of the noise received in the first channel. A raw noise covariance estimate for another channel falling between the particular channel and the first channel is similarly determined to be included if it is determined from a metric calculated from the raw noise covariance estimate for the other channel and a raw noise covariance estimate for a channel adjacent to the other channel that the raw noise covariance estimate for the other channel should be included and if the raw noise covariance estimates for every channel that falls between the other channel and the first channel are also determined to be included.

In an embodiment, calculating the final noise covariance estimate for the first channel comprises averaging over the first raw noise covariance estimate and any raw noise covariance estimates for which it has been determined from its metric that the raw noise covariance estimate should be included in the calculating of the final noise covariance estimate. An average provides a computationally simple and generally accurate estimate. Computational simplicity is desirable because it cuts down computation time and power usage.

In an embodiment, both the raw and the final noise covariance estimates are $N_{RX} \times N_{RX}$ matrices, where $N_{RX}$ is the number of antennas of the receiver.

In an embodiment, a raw noise covariance estimate for a channel is calculated by averaging one or more intermediate matrices, wherein each intermediate matrix is formed from a noise vector and its conjugate transpose, wherein each noise vector gives the noise received at each of the plurality of antennas at a particular time and frequency wherein that particular time and frequency falls within the given channel. An intermediate matrix formed from a noise vector and its conjugate transpose represents the covariance of that noise between the antennas of the receiver. Averaging these intermediate matrices for all noise vectors within a channel gives the average noise covariance on that channel. This is a reasonable, yet computationally simple, estimate of the actual covariance of noise received on that channel between the antennas of the receiver, which requires a relatively short computation time.

In an embodiment, the metric for a raw noise covariance estimate for two channels is a normalized log-likelihood based metric which is dependent only on the raw noise covariance estimates for said two channels. One of the two channels will be the channel for which a final noise covariance estimate is desired. As an example, these channels may be the first and second channels. Thus, the normalized log-likelihood based metric will in this case provide a measure of how well a second raw noise covariance estimate for a second channel represents the noise received in the first channel. The metric is normalized to be invariant to the signal to noise ratio of the first channel, so that metrics for different channels can be compared using a fixed threshold for each metric. Also, since the metric is only dependent on two raw noise covariance matrices, the processing required to calculate the metric is relatively low and the metric can be calculated relatively quickly.

In an embodiment, the metric for a raw noise covariance estimate for two channels is a normalized distance based metric which is dependent only on the raw noise covariance estimates for said two channels. One of the two channels will be the channel for which a final noise covariance estimate is desired. As an example, these channels may be the first and second channels. Thus, the normalized distance based metric will in this case provide a measure of how well a second raw noise covariance estimate for a second channel represents the noise received in the first channel. As above, the metric is normalized to be invariant to the signal to noise ratio of the first channel, so that metrics for different channels can be compared. Also, again, since the metric is only dependent on two raw noise covariance matrices, the processing required to calculate the metric is relatively low and the metric can be calculated relatively quickly.

In an embodiment, it is determined whether a particular raw noise covariance estimate should be included in the calculation of the final noise covariance estimate for the first channel by comparing the metric of that particular raw noise covariance estimate to a predetermined threshold. This threshold can be set to ensure that only raw noise covariance estimates with metrics that are sufficiently high enough or low enough (depending on the metric used) to indicate that that they provide a sufficiently good representation of the noise received in the first channel are included in the calculation of the final noise covariance estimate for the first channel. As an example, a "sufficiently good" raw noise covariance estimate may be one that would improve the final noise covariance estimate for the first channel if it were included in the calculation of that final noise covariance estimate.

In an embodiment, a channel is defined as a set of carrier signals that have frequencies within a certain frequency band, or are transmitted within a certain time slot, or that have frequencies within a certain frequency band and are transmitted within a certain time slot.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

Examples of embodiments of the present invention apply to receivers 100 with multiple antennas 140. Such receivers 100 receive signals on a plurality of channels, where a channel will be taken to be a set of one or more signals, which may be confined to a certain frequency range (e.g. frequency division multiple access) or a certain time slot (e.g. time division multiple access), or may have a particular coding (e.g. code division multiple access), or any combination thereof (e.g. orthogonal frequency division multiple access (OFDMA)). Examples of embodiments of the present invention are particularly applicable in systems using RATS that use LTE (Long Term Evolution) or LTE-A (Long Term Evolution—Advanced) specifications and much of the following description is given in respect of LTE/LTE-A systems, it being understood that the present invention is not limited to use in such systems.

A receiver 100 receiving a desired signal from a particular transmitter 110 may also receive undesired interfering signals (noise) from other nearby transmitters 120. The nearby interfering transmitters 120 may send signals in certain channels but not in other channels, meaning that the amount of noise detected by the receiver 100 can vary significantly from channel to channel. In order to reject this undesired noise, a noise covariance matrix estimate (NOCE) may be calculated for each of the channels used by the receiver 100, as explained above, but to accurately estimate a NOCE for a particular channel, only the noise received in channels which receive a similar amount of noise to that received in the particular channel should be included in the NOCE calculation.

Figure 2:
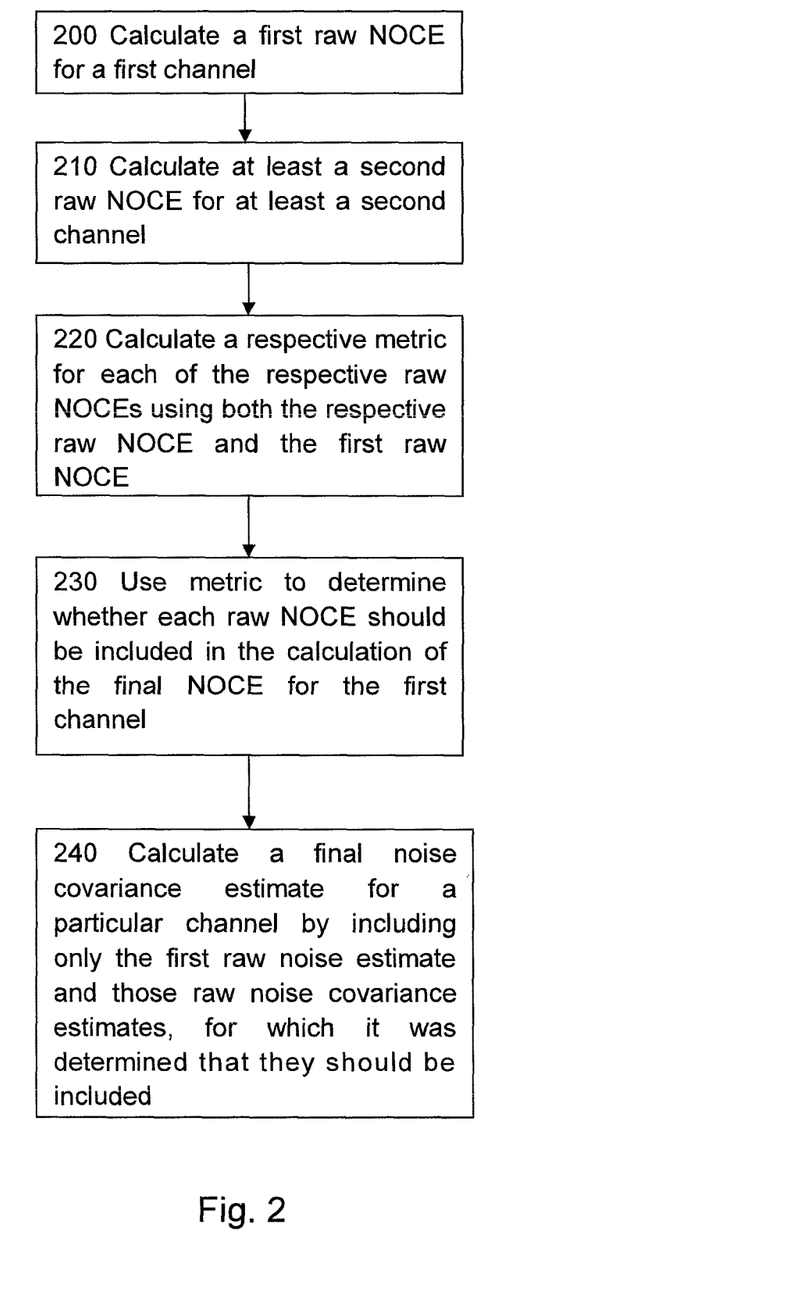
FIG. 2 shows schematically a flowchart illustrating an example of a method according to embodiments of the present invention.

FIG. 2 shows schematically a flowchart illustrating an example of a method for use by a receiver 100 with a plurality of antennas according to an embodiment of the present invention, wherein a final NOCE is estimated for a first channel. The first channel may be, for example, a particular PRB (physical resource block) pair (explained in more detail below) if the modulation scheme is OFDMA. As another example, the first channel may be a particular time slot, if the modulation scheme is TDMA for example. First, a raw noise covariance estimate ("raw NOCE") is determined for the first channel 200. This raw NOCE is a preliminary estimate of the covariance of the noise received on the first channel between the plurality of antennas of the receiver 100. Covariance is a measure of how much two or more random variables (in this case the noise at two or more antennas) change together. In other words, in this context, covariance is a measure of the correlation between noise received on the first channel at the plurality of antennas of the receiver. The final NOCE for the first channel is a final estimate of the covariance of the noise received on the first channel between the plurality of antennas of the receiver 100 and is, in general, an improved estimate of the covariance of the noise received on the first channel between the plurality of antennas of the receiver over the preliminary raw NOCE.

In one example, the first raw NOCE is represented by a matrix and is calculated according to Eqn. 3 below:

$$C_{raw}(1) = \Sigma_{v,t} w_{v,t} n_{v,t} n_{v,t}^H \qquad \text{Eqn. 3}$$

where $n_{v,t}$ is a vector representing the noise received by each of the antennas of the receiver 100 at a particular time and frequency, and $n_{v,t}^H$ is its conjugate transpose (v and t denoting time and frequency respectively). $w_{v,t}$ is a weighting factor, which is also time and frequency dependent. In this particular example, only the noise vectors for noise received within the first channel are used in the calculation of $C_{raw}(1)$.

In another example, noise vectors received in other channels may also be included. In a particular example, the noise vectors received in other channels may have lower weightings than the noise vectors received in the first channel. As mentioned above, the product $n_{v,t} n_{v,t}^H$ forms a matrix, which can be thought of as an "intermediate" matrix, which represents the covariance of received noise between the plurality of antennas of the receiver 100 at a particular time and frequency. Thus, in this example, the raw NOCE matrix for the first channel $C_{raw}(1)$ can be regarded as being formed from a weighted average over all the "intermediate" matrices $n_{v,t} n_{v,t}^H$ formed from noise vectors received within the first channel, or, in other words, an average over the covariance of noise between the plurality of antennas of the receiver 100 received at times and frequencies within the first channel.

It is well known that noise vectors $n_{v,t}$ can be calculated from reference signals received by the receiver 100 according to Eqn. 4 below:

$$n_{t,v} = r_{t,v} - h_{t,v} s_{t,v} \qquad \text{Eqn. 4}$$

where $r_{t,v}$ is a received reference signal, $s_{t,v}$ is a known pilot signal and $h_{t,v}$ is a channel estimate, which is itself estimated using the reference signal $r_{t,v}$ according to known prior art methods. The noise vectors have $N_{RX}$ components, where $N_{RX}$ is the number of antennas the receiver 100 has, and each component represents the noise received at a respective antenna of the receiver 100.

Once the raw NOCE has been calculated for the first channel, a raw NOCE is calculated for at least a second channel 210. The raw NOCE for the second channel in this example is also calculated according to Eqn. 3 but this time, only noise vectors received within that second channel are used in the calculation of the second raw NOCE.

In one example, raw NOCEs are also calculated for further channels in a similar way, using noise vectors received in those further channels. In one particular example, raw NOCEs are calculated for all channels that are "close" to the first channel, but not those that are "far away". The NOCEs for "far away" channels are in practice unlikely to provide a good representation of the noise received on the first channel and will later be discarded (as explained below). This is because the noise received in these "far away" channels is more likely to be significantly different from the noise received in the first channel than the noise received in the "nearby" channels. Thus, ignoring channels that are far away (in the time and/or frequency domains) from the first channel at this stage reduces the number of raw NOCEs that need to be calculated (and also the number of metrics that need to be calculated, as explained below) and thus cuts down computation time.

As a particular example, raw NOCEs are calculated for all channels that are within some predetermined boundary of the first channel, for example a predetermined frequency range from the frequency boundaries of the first channel. This can be achieved, for example, by consecutively numbering consecutive channels in the frequency domain as illustrated schematically by FIG. 3A. If a final NOCE is desired for a channel p, raw NOCEs can be calculated for all channels q, where q∈[p+M,p−M]. For example, if M=2 and p=1, then raw NOCEs will be calculated for channels −1 to 3, but not channels −2 and 4.

In another example, raw NOCEs are calculated for all channels that are within a predetermined time range from the time boundaries of the first channel. This can be achieved, for example, by numbering consecutive channels in the time domain as illustrated schematically by FIG. 3B. If a final NOCE is desired for a channel p, raw NOCEs can be calculated for all channels q, where q∈[p+M,p−M]. For example, if M=2 and p=1 again, then raw NOCEs will be calculated for channels −1 to 3, but not channels −2 and 4.

In a further example, raw NOCEs are calculated for all channels that are within both a predetermined frequency range from the frequency boundaries of the first channel and a predetermined time range from the time boundaries of the first channel. This could apply, for example, if an OFDMA modulation scheme is in use, because the channels (such as PRBs) have both time and frequency dimensions.

In one particular embodiment, once the raw NOCE has been calculated for the second channel, a metric is calculated for that second channel using the raw NOCE for the first channel and the raw NOCE for that second channel 220. The metric is a statistical measure of how well a particular raw NOCE describes or explains the noise vectors received in the first channel. In a particular example, if additional channels are taken into account, such as other nearby channels, corresponding metrics are calculated for each of those additional channels using the raw NOCE for the first channel and the raw NOCE calculated for each of those additional channels.

In one example, a number of noise vectors nm(1) are received in the first channel, where m is an index denoting the different noise vectors. In one example, where only noise vectors received in the first channel are considered, there are $N_{RS}(1)$ of these noise vectors, where $N_{RS}(1)$ is the number of reference signals received in the first channel, because there can be one noise vector calculated for each received reference signal, as indicated by Eqn. 4. Thus, in this example, the index m will range from 0 to $N_{RS}(1)-1$. The noise vectors nm(1) for the first channel can all be written more simply as a vector n(1), where each component of n(1) is a noise vector nm(1) received in the first channel.

A metric that tests or provides a measure of how well the or each raw NOCE describes or explains the noise vectors received in the first channel is then calculated. A number of different ways of calculating this metric are possible. In one particular example, a log-likelihood based test is applied to the second raw NOCE, and any other raw NOCEs that have been calculated for other nearby channels, to provide a metric. A particular example of this is shown in Eqn. 5 below:

$$L(n(1)|C_{raw}(q)) = -N_{RS}\log(\pi^{N_{RX}}det(C_{raw}(q))) - \sum_{m=0}^{N_{RS}-1} n_m^H(1) C_{raw}^{-1}(q) n_m(1) \qquad \text{Eqn. 5}$$

where $C_{raw}(q)$ is the raw NOCE calculated for some channel q, which may be the second channel or may be any other channel for which a raw NOCE has been calculated. The metric $L(n(1)|C_{raw}(q))$ scales with the signal-to-noise ratio on the first channel, because the signal to noise ratio in the first channel affects both the scaling of n(1). Automatic gain control may also affect the signal scaling at all times, and may thus also affect the scaling of n(1). Thus, this log-likelihood metric typically cannot be used in precisely this form to compare how effectively raw NOCEs for different channels q represent the noise received in the first channel because the metric will scale with the noise received in the first channel. Thus, the log-likelihood metric is preferably normalised to provide a normalised metric $R_{LLR}(1,q)$. An example of this is shown in Eqn. 6:

$$R_{LLR}(1,q) = L(n(1)|C_{raw}(q)) - L(n(1)|C_{raw}(1)) \qquad \text{Eqn. 6}$$

which is independent of the signal-to-noise ratio received in the first channel and the scaling of the noise vector n(1) and, using Eqn. 5, can be written as:

$$R_{LLR}(1,q) = -N_{RS}[\log(det(C_{raw}(q))) - \log(det(C_{raw}(1))) + tr(C_{raw}^{-1}(q) C_{raw}(1)) - 2] \qquad \text{Eqn. 7}$$

It will be understood that in this normalized form, the normalized log-likelihood metric will scale with the signal to noise ratio received in channel q (because Craw(q) scales with the signal to noise ratio on channel q), and thus this metric provides a good representation of how well Craw(q) describes the noise received in channel 1. It will also be noted that $R_{LLR}(1,q)$ is only a function of the raw NOCEs for the first and second channels (and possibly other nearby channels) and, in this form, it is not a function of the noise vectors nm(1). This significantly simplifies the calculation of $R_{LLR}(1,q)$ over the calculation of the un-normalized log-likelihood based metric L(n(1)|Craw(q)), which depends on both the noise vectors received in the first channel and the raw NOCEs for the first and second channels. In practice, this means the processing required to calculate $R_{LLR}(1,q)$ is relatively low and the calculation can be carried out quickly. Thus the time taken to calculate a NOCE as discussed herein is not significantly extended over the time taken to calculate a NOCE according to methods known in the prior art and the NOCE can be calculated without a severe impact on other processing being carried out.

In one embodiment, each metric is then used to determine 230 whether its respective raw NOCE should be included in the calculation of the final NOCE for the first channel. In one example, this may be determined by comparing $R_{LLR}(1,q)$ to a predetermined threshold $T_{LLR}$, which establishes whether the raw NOCE for the channel q provides a sufficient description of the noise received in the first channel. If $R_{LLR}(1,q)$ is greater than $T_{LLR}$ then the raw NOCE is included in the calculation of the final NOCE for the first channel. In one example, the threshold $T_{LLR}$ is a fixed negative value. In another example, the threshold $T_{LLR}$ is a function of $N_{RS}(q)$, which is the number of reference signals received in the channel q and which may be different for different channels.

The final NOCE for the first channel is then calculated by using the first raw NOCE and any other raw NOCEs for which it has been determined from their metric that they should be included in the calculation of the final NOCE for the first channel 240. In one embodiment of the present invention, the final NOCE for the first channel is calculated by averaging over the first raw NOCE and any other raw NOCEs for which it has been determined by their metric that they should be included in the calculation of the final NOCE for the first channel. As a particular example, the final NOCE for the first channel may be calculated according to Eqn. 8 as follows:

$$C_{final}(1) = \frac{1}{\sum_q w(1,q)} \sum_{q=1-M}^{1+M} w(1,q) C_{raw}(q) \quad \text{where} \qquad \text{Eqn. 8}$$

$$w(1,q) = \begin{cases} 1, & \text{if } R_{LLR}(1,q) > T_{LLR} \text{ or } q = 1 \\ 0, & \text{otherwise} \end{cases}$$

and M is a predetermined value (as defined above), which ensures that only channels that are "nearby" to the first channel are used in the calculation of the final NOCE for the first channel.

In an alternative example, a normalized distance metric $R_{DIST}(1,q)$ is used instead of a log-likelihood based metric $R_{LLR}(1,q)$. $R_{DIST}(1,q)$ again provides a measure of how well the raw NOCE for the channel q describes the noise received in the first channel. Again, $R_{DIST}(1,q)$ only depends on the raw NOCEs for the first channel and channel q, as can be seen in Eqn. 10. Thus again, the metric $R_{DIST}$ is relatively computationally simple and does not significantly extend the time required to calculate a final NOCE beyond the times taken by prior art methods.

$$R_{DIST}(1,q) = \frac{\|C_{raw}(q) - C_{raw}(1)\|^2}{(tr(C_{raw}(1)))^2} \qquad \text{Eqn. 9}$$

The matrix norm (indicated by $\| \ldots \|$) can be calculated according to any known method. For example, the matrix norm may be a Frobenius norm. The numerator is squared, meaning that square-root operations are avoided, which are typically moderately complex to implement in both hardware and software, and the denominator is provided to ensure that the $R_{DIST}$ is invariant to signal-to-noise ratio and input signal scaling.

In one embodiment, where a distance metric, such as $R_{DIST}(1,q)$, is used for the metric, a distance metric (such as $R_{DIST}(1,q)$) is again calculated for every channel q for which a raw NOCE has been calculated. In one embodiment of the present invention, each of these metrics is then compared to a predetermined threshold to determine whether the raw NOCE for each channel q should be included in the calculation of the final NOCE for the first channel. In a particular example, the raw NOCE for a channel q is determined to be included if $R_{DIST}(1,q)$ is less than a predetermined threshold value $T_{DIST}$. Again, $T_{DIST}$ may in one example be constant and, in another example, $T_{DIST}$ may be a function of $N_{RS}(q)$.

In one example according to the this embodiment, the final NOCE can be calculated according to Eqn. 9, where the weighting factor w(1,q) in this case is given by:

$$w(1,q) = \begin{cases} 1, & \text{if } R_{LLR}(1,q) < T_{DIST} \text{ or } q = 1 \\ 0, & \text{otherwise} \end{cases}$$

In embodiments of the present invention, comparing metrics to predetermined thresholds allows raw NOCEs that do not provide good representations of the noise received in a first channel to be identified and filtered out from the raw NOCEs that are actually used to calculate the final NOCE for the first channel.

In preferred embodiments, the method would be repeated in the same way for all channels for which a final NOCE is desired. For example, if a receiver is receiving data on three channels, then final NOCEs will, in general, be desired for all three of these channels. By taking any channel for which a final NOCE is desired to be the "first channel", the above equations and methods can be used to calculate a final NOCE for that channel.

As noted above, the present invention can in general be applied to any receiver 100 with a plurality of antennas using any modulation scheme. The following outlines how the present invention can be applied to a particular example where a receiver 100 is using an OFDMA modulation scheme according to LTE specifications. In the following example, for simplicity, the receiver 100 will be taken to have two spatially separate antennas.

Figure 4:
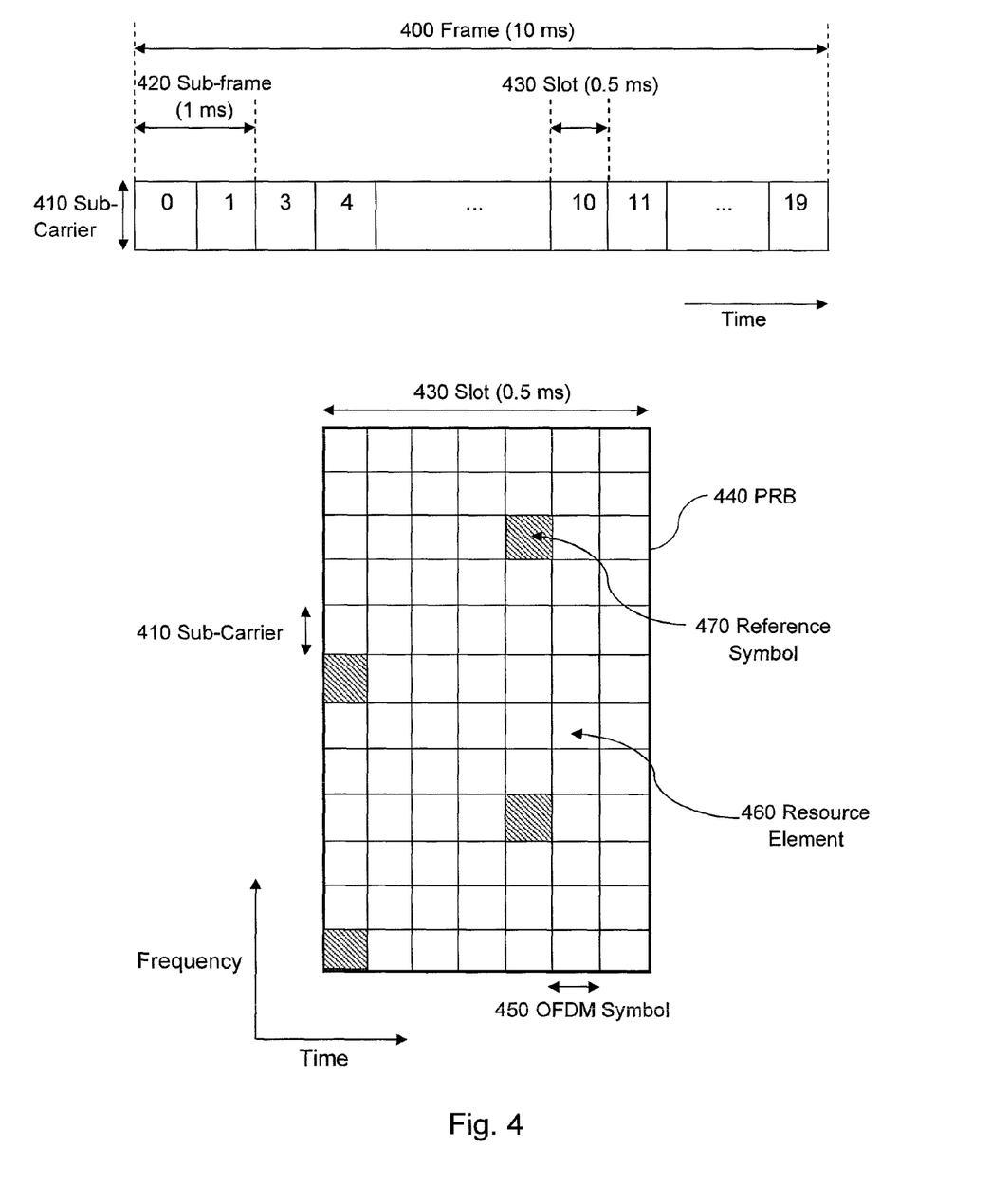

FIG. 4 shows schematically an example of a typical OFDMA frame structure, such as used according to LTE specifications, and is provided to help illustrate how a channel may be defined. Each frame 400 (on a particular frequency or "sub-carrier" 410) is of 10 ms duration is divided into ten sub-frames 420 of 1 ms each. Each subframe is further divided into two time slots 430 of 0.5 ms each. A receiver 100 will be assigned at least one physical resource block (PRB) 440, which is made up of a number of consecutive sub-carriers 410 and a number of OFDM symbols 450 which are broadcast consecutively for a duration of the time slot 430. A PRB 440 is the smallest element of resource allocation that can be assigned to any receiver 100, and thus is a good definition of a channel. However, an OFDMA channel may alternatively be defined as, for example, a particular sub-carrier 410 broadcast within a particular time slot 430, or a pair of PRBs 440 which are broadcast within the same sub-frame 420 (on the two time slots 430 of that time frame 420). In all cases, as mentioned above, a channel in OFDMA has both frequency and time dimensions.

Reference signals 470 are broadcast periodically and on different subcarriers 410 of the PRB 440. In the example shown in FIG. 4, there are 4 reference signals broadcast per PRB 440.

In one example, the channel is taken to be a PRB pair (in particular a pair of PRBs 440 broadcast within the same sub-frame 420) and a final NOCE is desired for a particular PRB pair, which can be referred to as the "first" PRB pair. In order to calculate a raw NOCE for this first PRB pair, noise vectors are calculated for each of the reference signals 470 received in that PRB pair according to Eqn. 4 above. Thus, if the number of reference signals received within each PRB 440 is constant, then there will be 8 reference signals received within the first PRB pair and, correspondingly, there can be up to 8 noise vectors calculated. These noise vectors give the estimated noise received at the two antennas of the receiver 100 at the times at which and on the sub carriers on which the reference signals were received.

Once the noise vectors have been calculated for the first PRB pair, a first raw NOCE can be calculated for the first PRB pair according to Eqn. 3 above, where the sum ranges over all noise vectors that can be calculated in the first PRB pair.

Noise vectors and subsequently raw NOCEs can then be calculated in the same way for other PRB pairs. In one example, raw NOCEs are calculated for PRB pairs that arrive at different times from the arrival time of the first PRB pair, and for PRB pairs that are made up of different sub-carriers 410 from those making up the first PRB pair, and also for PRB pairs that arrive at different times and comprise different sub-carriers 410. In another example, raw NOCEs are only calculated for PRB pairs that are received at the same time as the first PRB pair, but are made up of different sub-carriers 410 to those making up the first PRB pair. This means that the final NOCE for the first PRB pair will be an average in the frequency domain over raw PRB pairs but will not take into account any variation of received noise in the time domain. Averaging in only the frequency domain (rather than in both domains) means that fewer raw NOCEs need to be calculated to estimate a final NOCE for a particular PRB pair, thus reducing the time required to come up with that final NOCE. Averaging in only the frequency domain may be appropriate, for example, when eICIC (enhanced inter-cell interference coordination) is used by nearby transmitters, because, in this case, variation in the noise received in a particular set of sub-carriers 410 (for example the subcarriers that make up the first PRB pair) over time may be relatively large and will, in general, not be correlated to the noise received in previous/successive sets of subcarriers. For example, in eICIC, a certain cell can transmit over time a mixture of so-called "almost blank subframes", which contain only reference signals and control channels but no data, and "normal" subframes, which do (or may) contain data. Averaging in the time domain thus means that both almost blank subframes and normal sub-frames may be included in an average, which is preferably avoided.

Figure 3A:
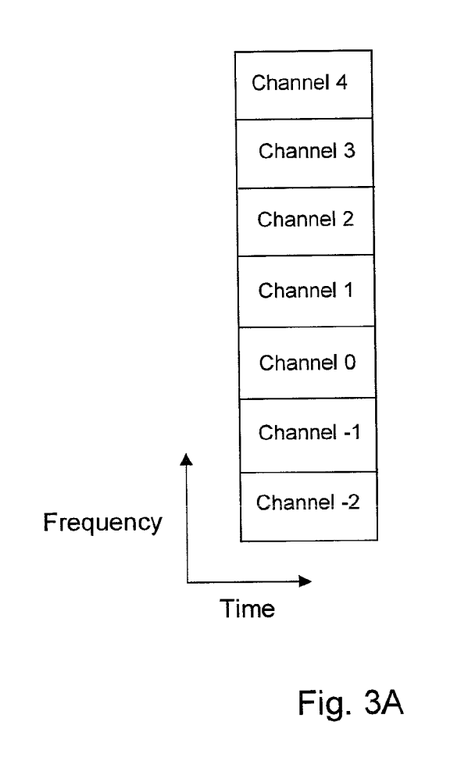
FIGS. 3A and 3B show schematically examples of numbering of channels according to an embodiment of the present invention; and, FIG. 4 shows schematically an OFDMA frame structure according to LTE specifications.
Figure 3B:
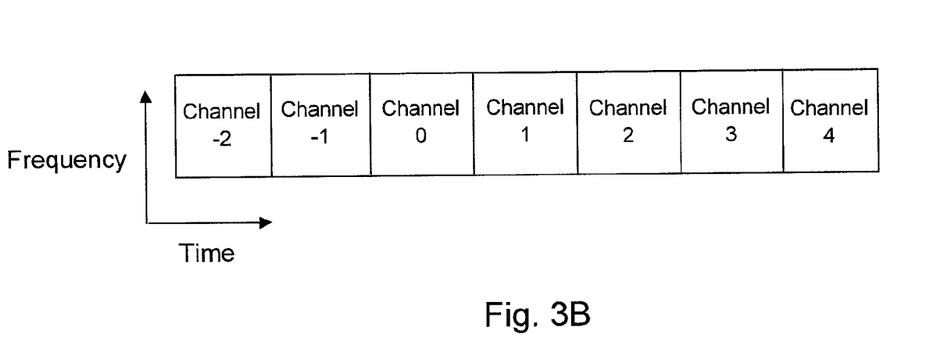

As discussed above, it may be that raw NOCEs are not calculated for PRB pairs that are made up of sub-carriers 410 that are far away (in the frequency domain) from the sub-carriers 410 of the first PRB pair. This may be achieved, in one example, by consecutively numbering consecutive PRB pairs, as illustrated in FIG. 3A. In this case, channel 1 is taken to be the first PRB pair and channels 2 and 0 are taken to be PRB pairs that comprise subcarriers that follow consecutively from the sub-carriers 410 of the first PRB pair. In this case, raw NOCEs can be calculated for all channels q, where q∈[1+M,1−M]. In the present example, M can be set to a fixed integer such that, for example, 0<M<6. Setting M=4, for example, means that raw NOCEs for PRB pairs numbered from 5 upwards and from −4 downwards have been determined to be unlikely to represent sufficiently well the noise received in PRB pair 1.

In one embodiment, once the raw NOCEs have been calculated for these other PRB pairs, metrics can be calculated for each of these raw NOCEs. These metrics could be determined, for example, according to either Eqn. 7 or Eqn. 9, and can then be used to determine which raw NOCEs should be used to calculate the final NOCE for the first PRB pair. This may be determined for example by comparing each metric to a predetermined threshold. The final NOCE for the first PRB pair can then be calculated, for example according to Eqn. 8, where appropriate weightings are used depending on the metric used. The method can be repeated to find final NOCEs for other PRB pairs if desired. If this is the case, then computation of the final NOCE for a different PRB pair may by quicker than it was for the first final NOCE, because some of the required raw NOCEs may have already been calculated. In one example, where it is known that final NOCEs are desired for several PRB pairs, then it may be that all of the raw NOCEs that will be required to calculate the several final NOCEs are calculated before any final NOCEs are calculated. Further, it will be understood that in general, many of the steps outlined above can be carried out in different orders to achieve the same result and these alternative orderings are considered to be within the scope of the present invention.

In an alternative embodiment, raw NOCEs are calculated for a number of successive channels. In a particular example, raw NOCEs are calculated for all channels for which a final NOCE is required. In another example, raw NOCEs are calculated for all channels within a specified range from a channel for which a final NOCE is required. Metrics are calculated for each adjacent pair of channels, the channels being labeled, for example, as m and m−1, where m is a variable. In one example, this may be a log-likelihood based metric according to Eqn. 10 below:

$$R_{LLR}(m,m-1) = -N_{RS}[\log(det(C_{raw}(m-1))) - \log(det(C_{raw}(m))) + tr(C_{raw}^{-1}(m-1)C_{raw}(m)) - 2] \quad \text{Eqn.10}$$

In another example, this may be a distance-based metric according to Eqn. 11 below:

$$R_{DIST}(m, m-1) = \frac{\|C_{raw}(m-1) - C_{raw}(m)\|^2}{(tr(C_{raw}(m)))^2} \quad \text{Eqn. 11}$$

In this particular embodiment, a final NOCE for a particular channel p may be calculated by first using the metric M(p,p−1) to determine whether the raw NOCE for the channel p−1 should be included in the calculation of the final NOCE for the channel p. In one embodiment, M(p,p−1) is a metric which represents how well the raw NOCE for channel p−1 represents the noise received in channel p. This metric may for example be a log-likelihood based metric as in Eqn. 10 or a distance based metric as in Eqn. 11, or it may be a different type of metric altogether. In a particular example, it may be determined whether the raw NOCE for channel p−1 should be included by comparing the metric M(p,p−1) to a threshold T0.

In the present embodiment, if it is determined from the metric M(p,p−1) that the raw NOCE for channel p−1 should not be included, then the raw NOCEs for all channels p−n, where n>1, are also not included in the calculation of the final NOCE for the channel p.

On the other hand, if it is determined from the metric M(p,p−1) that the raw NOCE for channel p−1 should be included, then it is further determined, according to the metric M(p−1, p−2) for the next pair of adjacent channels p−1 and p−2, whether the raw NOCE for the next successive channel p−2 should be included in the calculation of the final NOCE for channel p. In one particular example, this is determined by comparing the metric M(p−1,p−2) to a threshold T1. If it is determined that the raw NOCE for channel p−2 should not be included, then no further raw NOCEs for further channels are included in the calculation of the final NOCE for channel p. Otherwise, if it is determined that the raw NOCE for channel p−2 should be included, it is then further determined whether the raw NOCE for the next channel p−3 should be included according to the metric M(p−2,p−3) for the pair of adjacent channels p−2 and p−3. This may be achieved by comparing the metric M(p−2,p−3) to a threshold T2.

This process is repeated using metrics for successive pairs of adjacent channels until it is determined that a raw NOCE should not be included in the calculation of the final noise covariance estimate for channel p or until raw NOCEs have been calculated for a predetermined number of channels. Once it has been determined that a raw NOCE should not be included, then no further raw NOCEs for channels successively further from channel p will be included in the calculation of the final NOCE for channel p.

As a particular example, it may be determined from the metric M(p,p−1) that the raw NOCE for channel p−1 should be included, and it may be further determined from the metric M(p−1,p−2) that the raw NOCE for channel p−2 should be included, however, it may then be determined from the metric M(p−2,p−3) that the raw NOCE for channel p−3 should not be included. In this case, the raw NOCEs for channels p, p−1 and p−2 will be included in the calculation of the final NOCE for channel p, but the raw NOCEs for all channels p−n, where n>2 will not be included.

In one embodiment, this process is carried out for channels that are successively further away from channel p in both directions. In this case, it can be assumed that the metric is approximately symmetric, and thus M(p,p+1)=M(p+1,p). Thus, it is only necessary to calculate one metric for each pair of channels. For example, the metric M(p+1,p) is used to determine whether the raw NOCE for channel p+1 should also be included in the calculation of the final noise covariance estimate for channel p. If it is determined that the raw NOCE for channel p+1 should be included, it is then determined according to the metric M(p+2,p+1) whether the raw NOCE for channel p+2 should be included, and so on for further channels, until it is determined that a raw NOCE for a particular channel should not be included. Again, once it has been determined that a raw NOCE should not be included, then no further raw NOCEs for channels successively further from channel p will be included in the calculation of the final NOCE for channel p. Again, it may be that the metrics are compared to thresholds to determine whether particular raw NOCEs should be included.

In the particular example, where metrics are compared to thresholds to determine whether particular raw NOCEs should be included in the calculation of the final NOCE for channel p, the thresholds may be the same for each metric (i.e. $T_0=T_1=T_2=\ldots$) or it may be that the thresholds are different. As a particular example, where a distance based metric is used, then the thresholds may be such that $T_0>T_1>T_2>\ldots$.

Once it has been determined which raw NOCEs should be included in the calculation of the final NOCE for channel p, these raw NOCEs are averaged as in, for example, Eqn. 8.

This embodiment enables metrics to be re-used for other channels. In other words, once a metric for a pair of channels has been calculated in order to calculate the final NOCE for a particular channel, then that metric for that pair of channels does not have to be calculated again during calculation of the final NOCE for any other channel. This saves time and reduces power consumption during the processing stages.

It may be that there are several different types of reference signals received in one or more channels. Types of reference signals may include, for example, cell-specific reference signals or user-based reference signals. In this case it may be that final NOCEs are calculated for a particular channel for each type of reference signal separately according to one of the embodiments described above. For example, if both cell-specific reference signals and user-based reference signals are received in a number of channels, then a first final NOCE for a particular channel may be calculated using only raw NOCEs calculated from the cell-specific reference signals. A second final NOCE may be calculated for that particular channel using only raw NOCEs calculated from user-based reference signals. In one embodiment, these two final NOCEs for the particular channel can then be combined to give the ultimate desired final NOCE for that channel.

Different types of reference signal may experience different types of interference. For example, a first type of reference signal may predominantly be interfered with by reference signals from an interfering base station (known as reference signal collision), whereas a second type of reference signal (which is in the same channel as the first reference signal) may predominantly be interfered with by data transmissions from an interfering base station. In one example, it may be that a NOCE that (mostly) describes data transmission interference is desired. In this example, if it is known (or expected) that a particular type of reference signal is likely to mostly experience this type of interference, then this type of reference signal may be a "preferred" reference signal.

As an example, a first reference signal may be known (or expected) to experience a certain type of interference, and an ultimate desired final NOCE may be desired for a particular channel that (mostly) describes that type of interference. If there is a second type of reference signal, then it can be determined whether a final NOCE for that particular that was calculated using the second type of reference signal should be included in that ultimate desired final NOCE for that channel by calculating a log-likelihood based metric according to Eqn. 12.

$$R_{LLR}(RS1,RS2)=-N_{RS}[\log(det(C_{final}(RS2)))-\log(det(C_{final}(RS1)))+tr(C_{final}^{-1}(RS2)C_{final}(RS1))-2 \quad \text{Eqn. 12}$$

where $C_{final}(RS1)$ is the final NOCE for that particular channel calculated using the first type of reference signal and $C_{final}(RS2)$ is the final NOCE for that particular channel calculated using a second type of reference signal. This metric describes how well $C_{final}(RS2)$ describes the noise received in that particular channel by the first type of reference signals. The metric may then be compared to a threshold to determine whether $C_{final}(RS2)$ should be included in the calculation of the ultimate desired final NOCE for that channel. The threshold may be the same as or different to the threshold used to determine whether to include raw NOCEs in the calculation of a final NOCE. If it is determined that $C_{final}(RS2)$ should be included, then the ultimate desired final NOCE for that channel is, in one example, calculated by averaging $C_{final}(RS1)$ and $C_{final}(RS2)$. Else, the ultimate desired final NOCE is simply $C_{final}(RS1)$.

It will be understood that if there are more than two types of reference signal in a particular channel, then final NOCEs for that channel may be calculated for each of these types of reference signal. Metrics may than be calculated using one of these final NOCEs and a "preferred" final NOCE, the "preferred" final NOCE being the final NOCE that was calculated using a "preferred" type of reference signal (as explained above). It will also be understood that other types of metric could be used, for example, a distance-based metric.

In an alternative embodiment, where again there are a number of different types of reference signal received, the metric comparison may occur at an earlier stage. Again, there may be a particular type of reference signal that is expected to (mostly) experience a particular type of interference and it may be desired that a final NOCE for a particular channel (mostly) describes this type of interference. This type of reference signal may be selected as a "preferred" reference signal. In one embodiment, raw NOCEs for a channel are calculated using each type of reference signal received on that channel separately. Metrics may then be calculated to compare how well these raw NOCEs describe the noise received by the "preferred" type of reference signal in that channel. These metrics may be used to determine which raw NOCEs should be included in obtaining a "subsequent" raw NOCE for that particular channel. The "subsequent" raw NOCEs for a number of channels may be used to obtain a final NOCE. As an example, a final NOCE for a certain channel may be calculated from these "subsequent" raw NOCEs according to embodiments outlined above (for example, by calculating a metric for each of the "subsequent" raw NOCEs and then using these metrics to determine which "subsequent" raw NOCEs should be included in the calculation of the final NOCE).

In a particular example, it may be that both cell-specific reference signals and user-based reference signals are received in a number of channels. In this case, respective first and second raw NOCEs are calculated for each channel using the cell-specific and user-based reference signals respectively. It may be that the cell-specific reference signals are expected to (mostly) experience a particular type of interference and it may be that a final NOCE is desired that (mostly) describes that particular type of interference. Thus, in this example, the cell-specific reference signal is a "preferred" reference signal. For each channel, a metric is calculated that indicates how well the second raw NOCE for that channel describes the noise received by cell-specific reference signals received on that channel. The metric may then be used to determine whether the second raw NOCE should be included in the "subsequent" raw NOCE for that channel. If it is determined that it should be included, then the "subsequent" raw NOCE for a particular channel may be, for example, calculated by averaging the first and second raw NOCEs for that channel. Otherwise, the "subsequent" NOCE will just be the first raw NOCE for that channel. Once a "subsequent" raw NOCE has been calculated for a particular channel, a metric can be calculated for that "subsequent" raw NOCE according to, for example, Eqn. 7 or Eqn. 9. This metric can then be used to determine whether the "subsequent" raw NOCE should be included in the calculation of a final NOCE for a desired channel. The final NOCE for that desired channel may, in one example, be an average of all "subsequent" NOCEs that were determined from their metrics that they should be included in the calculation of the final NOCE.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for calculating in a receiver a final noise covariance estimate for a first channel, for use in reducing noise in that first channel, wherein the receiver comprises a plurality of antennas and, wherein the final noise covariance estimate is a final estimate of the covariance of the noise received on the first channel between the plurality of antennas of the receiver, the method comprising:

calculating a first raw noise covariance estimate, which is an initial estimate of the covariance of the noise received on the first channel between the plurality of antennas of the receiver;

calculating at least a second raw noise covariance estimate, which is an initial estimate of the covariance of the noise received on a second channel between the plurality of antennas of the receiver;

calculating a first metric for the second channel based on the first and second raw noise covariance estimates, said first metric being a statistical measure indicative of how well the second raw noise covariance estimate describes the noise in the first channel;

determining, based on the first metric, whether the second raw noise covariance estimate should be included in the calculation of the final noise covariance estimate for the first channel;

calculating the final noise covariance estimate for the first channel using at least the first and second raw noise covariance estimates if it is determined that the second raw noise covariance estimate should be included in the calculation of the final noise covariance estimate for the first channel; and calculating the final noise covariance estimate for the first channel using at least the first raw noise covariance estimate but not the second raw noise covariance estimate if it is determined that the second raw noise covariance estimate should not be included in the calculation of the final noise covariance estimate for the first channel.

2. A method according to claim 1, comprising:

calculating at least a third raw noise covariance estimate for noise received on a third channel;

calculating a second metric for the third channel based on the first and third raw noise covariance estimates, said second metric being a statistical measure indicative of how well the third raw noise covariance estimate describes the noise in the first channel; and determining, based on the second metric, whether the third raw noise covariance estimate should be included in the calculation of the final noise covariance estimate for the first channel;

wherein the calculating the final noise covariance estimate for the first channel uses the third raw noise covariance estimate if it is determined that the third raw noise covariance estimate should be included in the calculation of the final noise covariance estimate for the first channel, the calculating of the final noise covariance estimate for the first channel not using the third raw noise covariance estimate if it is determined that the third raw noise covariance estimate should not be included in the calculation of the final noise covariance estimate for the first channel.

3. A method according to claim 1, wherein a respective raw noise covariance estimate and a respective metric are calculated for each channel that falls within a predetermined time range and a predetermined frequency range from the time and frequency of the first channel, and wherein the final noise covariance estimate for the first channel is calculated using the first raw noise covariance estimate and all other calculated raw noise covariance estimates for which it is determined from their respective metrics that they should be included in the calculation of the final noise covariance estimate for the first channel.

4. A method according to claim 1, wherein the second channel is adjacent to the first channel and wherein:

if it is determined based on the first metric that the raw noise covariance estimate for the second channel should not be included in the calculation of the final noise covariance estimate for the first channel, then no further raw noise covariance estimates for channels that are successively further from the first channel than the second channel are included in the calculation of the final noise covariance estimate for the first channel; else, if it is determined based on the first metric that the raw noise covariance estimate for the second channel should be included in the calculation of the final noise covariance estimate for the first channel, then the method further comprises:

calculating a further raw noise covariance estimate for noise received in a further channel, the further channel being adjacent to the second channel, and being the channel that is consecutively further from the first channel after the second channel;

calculating a further metric for the the further channel using the raw noise covariance estimates for the second and further channels, said further metric being a statistical measure indicative of how well the further raw noise covariance estimate describes the noise in the second channel;

determining, based on the further metric, whether the raw noise covariance estimate for the further channel should be included in the calculation of the final noise covariance estimate for the first channel;

calculating the final noise covariance estimate for the first channel using at least the first and second raw noise covariance estimates, but not the raw noise covariance estimate for the further channel or any additional channels that are successively further from the first channel than the further channel, if it is determined that the further raw noise covariance estimate should not be included in the calculation of the final noise covariance estimate for the first channel; and calculating the final noise covariance estimate for the first channel using at least the first, second and further raw noise covariance estimates if it is determined that the raw noise covariance estimate for the further channel should be included in the calculation of the final noise covariance estimate for the first channel.

5. A method according to claim 4, wherein a raw noise covariance estimate for a subsequent channel is included in the calculation of the final noise covariance estimate for the first channel if it is determined based on an additional metric calculated from said raw noise covariance estimate for the subsequent channel and a raw noise covariance estimate for a channel adjacent to the subsequent channel that said raw noise covariance estimate for the subsequent channel should be included in the calculation of the final noise covariance estimate for the first channel, said additional metric being a statistical measure indicative of how well the raw noise covariance estimate for the subsequent channel describes the noise in the channel adjacent to the subsequent channel, and if the raw noise covariance estimates for every channel that falls between the subsequent channel and the first channel are also determined to be included in the calculation of the final noise covariance estimate for the first channel.

6. A method according to claim 1, wherein calculating the final noise covariance estimate for the first channel comprises averaging over the first raw noise covariance estimate and any raw noise covariance estimates for which it has been determined from its metric that the raw noise covariance estimate should be included in the calculating of the final noise covariance estimate.

7. A method according to claim 1, wherein the metric for a raw noise covariance estimate is a normalised log-likelihood based metric which is dependent only on the raw noise covariance estimates on which the metric is based.

8. A method according to claim 1, wherein the metric for a raw noise covariance estimate is a normalised distance based metric which is dependent only on the raw noise covariance estimates on which the metric is based.

9. A method according to claim 1, wherein it is determined whether a particular raw noise covariance estimate should be included in the calculation of the final noise covariance estimate for the first channel by comparing the metric of that particular raw noise covariance estimate to a predetermined threshold.

10. A method according to claim 1, wherein a channel is defined as a set of carrier signals that have frequencies within a certain frequency band, or are transmitted within a certain time slot, or that have frequencies within a certain frequency band and are transmitted within a certain time slot.

11. A method according to claim 1, wherein both the raw and the final noise covariance estimates are $N_{RX} \times N_{RX}$ matrices, where $N_{RX}$ is the number of antennas of the receiver.

12. A method according to claim 11, wherein a raw noise covariance estimate for a channel is calculated by averaging one or more intermediate matrices, wherein each intermediate matrix is formed from a noise vector and its conjugate transpose, wherein each noise vector gives the noise received at each of the plurality of antennas at a particular time and frequency.

13. Apparatus for a receiver having a plurality of antennas, comprising:
   at least one processor; and
   at least one memory including computer program code;
   the at least one memory and the computer program code being configured to, with the at least one processor, cause the apparatus to at least:
   calculate a first raw noise covariance estimate, which is an initial estimate of the covariance of noise received on a first channel between the plurality of antennas of the receiver;
   calculate at least a second raw noise covariance estimate, which is an initial estimate of the covariance of the noise received on a second channel between the plurality of antennas of the receiver;
   calculate a first metric based on the first and second raw noise covariance estimates, said first metric being a statistical measure indicative of how well the second raw noise covariance estimate describes the noise in the first channel;
   determine, based on the first metric, whether the second raw noise covariance estimate should be included in the calculation of a final noise covariance estimate for the first channel, said final noise covariance estimate being a final estimate of the covariance of the noise received on the first channel between the plurality of antennas of the receiver for use in reducing noise in that first channel;
   calculate the final noise covariance estimate for the first channel using at least the first and second raw noise covariance estimates if it is determined that the second raw noise covariance estimate should be included in the calculation of a final noise covariance estimate for the first channel; and
   calculate the final noise covariance estimate for the first channel using at least the first raw noise covariance estimate but not the second raw noise covariance estimate if it is determined that the second raw noise covariance estimate should not be included in the calculation of a final noise covariance estimate for the first channel.

14. The apparatus according to claim 13, arranged to:
   calculate at least a third raw noise covariance estimate for noise received on a third channel;
   calculate a second metric for the third channel based on the first and third raw noise covariance estimates, said second metric being a statistical measure indicative of how well the third raw noise covariance estimate describes the noise in the first channel; and
   determine, based on the second metric, whether the third raw noise covariance estimate should be included in the calculation of the final noise covariance estimate for the first channel;
   wherein the calculating the final noise covariance estimate for the first channel uses the third raw noise covariance estimate if it is determined that the third raw noise covariance estimate should be included in the calculation of the final noise covariance estimate for the first channel, the calculating the final noise covariance estimate for the first channel not using the third raw noise covariance estimate if it is determined that the third raw noise covariance estimate should not be included in the calculation of the final noise covariance estimate for the first channel.

15. The apparatus according to claim 13, arranged to calculate a respective raw noise covariance estimate and a respective metric for each channel that falls within a predetermined time range and a predetermined frequency range from the time and frequency of the first channel, and wherein the final noise covariance estimate for the first channel is calculated using the first raw noise covariance estimate and all other calculated raw noise covariance estimates for which it is determined from their respective metrics that they should be included in the calculation of the final noise covariance estimate for the first channel.

16. A wireless device comprising at least two antennas and the apparatus according to claim 15.

17. The apparatus according to claim 15, wherein both the raw and the final noise covariance estimates are NRX×NRX matrices, where NRX is the number of antennas of the receiver.

18. The apparatus according to claim 17, wherein a raw noise covariance estimate for a channel is calculated by averaging one or more intermediate matrices, wherein each intermediate matrix is formed from a noise vector and its conjugate transpose, wherein each noise vector gives the noise received at each of the plurality of antennas at a particular time and frequency wherein that particular time and frequency falls within the given channel.

19. The apparatus according to claim 13, for use when the second channel is adjacent to the first channel, wherein:
   if it is determined based on the first metric that the raw noise covariance estimate for the second channel should not be included in the calculation of the final noise covariance estimate for the first channel, then the processing system is arranged to include no further raw noise covariance estimates for channels that are successively further from the first channel than the second channel in the calculation of the final noise covariance estimate for the first channel; else,
   if it is determined based on the first metric that the raw noise covariance estimate for the second channel should be included in the calculation of the final noise covariance estimate for the first channel, then the processing system is arranged to:
   calculate a further raw noise covariance estimate for noise received in a further channel, the further channel being adjacent to the second channel, and being the channel that is consecutively further from the first channel after the second channel;
   calculate a further metric for the further channel based on the raw noise covariance estimates for the further channel, said further metric being a statistical measure indicative of how well the further raw noise covariance estimate describes the noise in the second channel;

determine, based on the further metric, whether the raw noise covariance estimate for the further channel should be included in the calculation of the final noise covariance estimate for the first channel;

calculate the final noise covariance estimate for the first channel using at least the first and second raw noise covariance estimates, but not the raw noise covariance estimate for the further channel or any additional channels that are successively further from the first channel than the further channel, if it is determined that the further raw noise covariance estimate should not be included in the calculation of the final noise covariance estimate for the first channel; and calculate the final noise covariance estimate for the first channel using at least the first, second and further raw noise covariance estimates if it is determined that the raw noise covariance estimate for the further channel should be included in the calculation of the final noise covariance estimate for the first channel.

20. The apparatus according to claim 19, arranged to determine to include a raw noise covariance estimate for a subsequent channel in the calculation of the final noise covariance estimate for the first channel if it is determined from an additional metric calculated from said raw noise covariance estimate for the subsequent channel and a raw noise covariance estimate for a channel adjacent to the subsequent channel that said raw noise covariance estimate for the subsequent channel should be included in the calculation of the final noise covariance estimate for the first channel, said additional metric being a statistical measure indicative of how well the raw noise covariance estimate for the subsequent channel describes the noise in the channel adjacent to the subsequent channel, and if the raw noise covariance estimates for every channel that falls between the subsequent channel and the first channel are also determined to be included in the calculation of the final noise covariance estimate for the first channel.

21. The apparatus according to claim 13, arranged such that calculating the final noise covariance estimate for the first channel comprises averaging over the first raw noise covariance estimate and any raw noise covariance estimates for which it has been determined from its metric that the raw noise covariance estimate should be included in the calculating of the final noise covariance estimate.

22. The apparatus according to claim 13, wherein the metric for a raw noise covariance estimate is a normalised log-likelihood based metric which is dependent only on the raw noise covariance estimates on which the metric is based.

23. The apparatus according to claim 13, wherein the metric for a raw noise covariance estimate is a normalised distance based metric which is dependent only on the raw noise covariance estimates on which the metric is based.

24. The apparatus according to claim 13, wherein it is determined whether a particular raw noise covariance estimate should be included in the calculation of the final noise covariance estimate for the first channel by comparing the metric of that particular raw noise covariance estimate to a predetermined threshold.

25. The apparatus according to claim 13, wherein a channel is defined as a set of carrier signals that have frequencies within a certain frequency band, or are transmitted within a certain time slot, or that have frequencies within a certain frequency band and are transmitted within a certain time slot.

26. A non-transitory computer-readable storage medium comprising a set of computer-readable instructions stored thereon, which, when executed by a processing system, cause the processing system to at least:

calculate a first raw noise covariance estimate, which is an initial estimate of the covariance of noise received on a first channel between the plurality of antennas of the receiver;

calculate at least a second raw noise covariance estimate, which is an initial estimate of the covariance of the noise received on a second channel between the plurality of antennas of the receiver;

calculate a first metric based on the first and second raw noise covariance estimates, said first metric being a statistical measure indicative of how well the second raw noise covariance estimate describes the noise in the first channel;

determine, based on the first metric, whether the second raw noise covariance estimate should be included in the calculation of a final noise covariance estimate for the first channel, said final noise covariance estimate being a final estimate of the covariance of the noise received on the first channel between the plurality of antennas of the receiver for use in reducing noise in that first channel;

calculate the final noise covariance estimate for the first channel using at least the first and second raw noise covariance estimates if it is determined that the second raw noise covariance estimate should be included in the calculation of a final noise covariance estimate for the first channel; and calculate the final noise covariance estimate for the first channel using at least the first raw noise covariance estimate but not the second raw noise covariance estimate if it is determined that the second raw noise covariance estimate should not be included in the calculation of a final noise covariance estimate for the first channel.

27. The non-transitory computer-readable storage medium according to claim 26, further causing the processing system to:

calculate at least a third raw noise covariance estimate for noise received on a third channel;

calculate a second metric for the third channel based on the first and third raw noise covariance estimates, said second metric being a statistical measure indicative of how well the third raw noise covariance estimate describes the noise in the first channel; and determine, based on the second metric, whether the third raw noise covariance estimate should be included in the calculation of the final noise covariance estimate for the first channel;

wherein the calculating the final noise covariance estimate for the first channel uses the third raw noise covariance estimates if it is determined that the third raw noise covariance estimate should be included in the calculation of the final noise covariance estimate for the first channel, the calculating the final noise covariance estimate for the first channel not using the third raw noise covariance estimate if it is determined that the third raw noise covariance estimate should not be included in the calculation of the final noise covariance estimate for the first channel.

28. The non-transitory computer-readable storage medium according to claim 26, further comprising computer readable instructions such that a respective raw noise covariance estimate and a respective metric are calculated for each channel that falls within a predetermined time range and a predetermined frequency range from the time and frequency of the first channel, and wherein the final noise covariance estimate for the first channel is calculated using the first raw noise covariance estimate and all other calculated raw noise covariance estimates for which it is determined from their respective metrics that they should be included in the calculation of the final noise covariance estimate for the first channel.

29. The non-transitory computer-readable storage medium according to claim 26, further comprising computer readable instructions for use when the second channel is adjacent to the first channel, wherein:
   if it is determined based on the first metric that the raw noise covariance estimate for the second channel should not be included in the calculation of the final noise covariance estimate for the first channel, then the computer program is caused to execute code such that the processing system is arranged to include no further raw noise covariance estimates for channels that are successively further from the first channel than the second channel in the calculation of the final noise covariance estimate for the first channel; else,
   if it is determined based on the first metric that the raw noise covariance estimate for the second channel should be included in the calculation of the final noise covariance estimate for the first channel, then the computer program is caused to execute code such that the processing system is arranged to:
   calculate a further raw noise covariance estimate for noise received in a further channel, the further channel being adjacent to the second channel, and being the channel that is consecutively further from the first channel after the second channel;
   calculate a further metric for the further channel based on the raw noise covariance estimates for the second and further channels, said further metric being a statistical measure indicative of how well the further raw noise covariance estimate describes the noise in the second channel;
   determine, based on the further metric, whether the raw noise covariance estimate for the further channel should be included in the calculation of the final noise covariance estimate for the first channel;
   calculate the final noise covariance estimate for the first channel using at least the first and second raw noise covariance estimates, but not the raw noise covariance estimate for the further channel or any additional channels that are successively further from the first channel than the further channel, if it is determined that the further raw noise covariance estimate should not be included in the calculation of the final noise covariance estimate for the first channel; and
   calculate the final noise covariance estimate for the first channel using at least the first, second and further raw noise covariance estimates if it is determined that the raw noise covariance estimate for the further channel should be included in the calculation of the final noise covariance estimate for the first channel.

30. The non-transitory computer-readable storage medium according to claim 29, further comprising computer readable instructions such that the processing system is arranged to determine to include a raw noise covariance estimate for a subsequent channel in the calculation of the final noise covariance estimate for the first channel if it is determined based on an additional metric calculated from said raw noise covariance estimate for the subsequent channel and a raw noise covariance estimate for a channel adjacent to the subsequent channel that said raw noise covariance estimate for the subsequent channel should be included, said additional metric being a statistical measure indicative of how well the raw noise covariance estimate for the subsequent channel describes the noise in the channel adjacent to the subsequent channel, and if the raw noise covariance estimates for every channel that falls between the subsequent channel and the first channel are also determined to be included.

31. The non-transitory computer-readable storage medium according to claim 26, further comprising computer readable instructions such that calculating the final noise covariance estimate for the first channel comprises averaging over the first raw noise covariance estimate and any raw noise covariance estimates for which it has been determined from its metric that the raw noise covariance estimate should be included in the calculating of the final noise covariance estimate.

32. The non-transitory computer-readable storage medium according to claim 26, further comprising computer readable instructions such that calculating the final noise covariance estimate for the first channel comprises averaging over the first raw noise covariance estimate and any raw noise covariance estimate for which it has been determined from its metric that the raw noise covariance estimate should be included in the calculating of the final noise covariance estimate.

33. The non-transitory computer-readable storage medium according to claim 26, wherein both the raw and the final noise covariance estimates are NRX×NRX matrices, where NRX is the number of antennas of the receiver.

34. The non-transitory computer-readable storage medium according to claim 33, further comprising computer readable instructions such that a raw noise covariance estimate for a channel is calculated by averaging one or more intermediate matrices, wherein each intermediate matrix is formed from a noise vector and its conjugate transpose, wherein each noise vector gives the noise received at each of the plurality of antennas at a particular time and frequency wherein that particular time and frequency falls within the given channel.

35. The non-transitory computer-readable storage medium according to claim 26, further comprising computer readable instructions such that the metric for a raw noise covariance estimate is a normalised log-likelihood based metric which is dependent only on the raw noise covariance estimates on which the metric is based.

36. The non-transitory computer-readable storage medium according to claim 26, further comprising computer readable instructions such that the metric for a raw noise covariance estimate is a normalised distance based metric which is dependent only on the raw noise covariance estimates on which the metric is based.

37. The non-transitory computer-readable storage medium according to claim 26, further comprising computer readable instructions such that it is determined whether a particular raw noise covariance estimate should be included in the calculation of the final noise covariance estimate for the first channel by comparing the metric of that particular raw noise covariance estimate to a predetermined threshold.

38. The non-transitory computer-readable storage medium according to claim 26, wherein a channel is defined as a set of carrier signals that have frequencies within a certain frequency band, or are transmitted within a certain time slot, or that have frequencies within a certain frequency band and are transmitted within a certain time slot.

* * * * *